United States Patent [19]

Pellet et al.

[11] Patent Number: 4,960,504

[45] Date of Patent: * Oct. 2, 1990

[54] DEWAXING CATALYSTS AND PROCESSES EMPLOYING SILICOALUMINOPHOSPHATE MOLECULAR SIEVES

[75] Inventors: Regis J. Pellet, Croton-On-Hudson; Jule A. Rabo, Armonk; Gary N. Long, Putnam Valley; Frank P. Gortsema, Pleasantville; Albert R. Springer, Yonkers, all of N.Y.

[73] Assignee: UOP, Des Plaines, Ill.

[*] Notice: The portion of the term of this patent subsequent to Mar. 6, 2007 has been disclaimed.

[21] Appl. No.: 158,667

[22] Filed: Feb. 22, 1988

Related U.S. Application Data

[63] Continuation-in-part of Ser. No. 683,246, Dec. 18, 1984.

[51] Int. Cl.$^5$ .................. C10G 47/04; C10G 47/16
[52] U.S. Cl. ............................ 208/411; 208/18; 208/114
[58] Field of Search ................ 208/18, 111, 112, 114

[56] References Cited

U.S. PATENT DOCUMENTS

| | | | |
|---|---|---|---|
| Re. 28,398 | 4/1975 | Chen et al. | 208/111 |
| 3,140,249 | 7/1964 | Plank et al. | 208/120 |
| 3,140,251 | 7/1964 | Plank et al. | 208/120 |
| 3,140,252 | 7/1964 | Frilette | 208/120 |
| 3,140,253 | 7/1964 | Plank et al. | 208/120 |
| 3,755,138 | 8/1973 | Chen et al. | 208/33 |
| 3,894,938 | 7/1975 | Gorring et al. | 208/97 |
| 3,956,102 | 6/1974 | Hauck | 260/286 |
| 3,968,024 | 7/1976 | Gorring et al. | 208/111 |
| 4,011,154 | 3/1977 | Strangeland et al. | 208/59 |
| 4,067,797 | 1/1978 | Chen et al. | 208/15 |
| 4,213,847 | 7/1980 | Chen et al. | 208/111 |
| 4,239,654 | 12/1980 | Gladrow et al. | 208/120 |
| 4,327,236 | 4/1982 | Klotz | 585/481 |
| 4,360,419 | 11/1982 | Miller | 208/111 |
| 4,390,414 | 6/1983 | Cody | 208/111 |
| 4,431,518 | 2/1984 | Angevine et al. | 208/111 |
| 4,434,047 | 2/1984 | Hensley, Jr. et al. | 208/111 |
| 4,440,871 | 4/1984 | Lok et al. | 208/114 |
| 4,440,991 | 10/1981 | Sorenson | 200/6 R |
| 4,443,329 | 4/1984 | Eberly, Jr. et al. | 208/111.01 C |

(List continued on next page.)

FOREIGN PATENT DOCUMENTS

| | | | |
|---|---|---|---|
| 0209997 | 1/1987 | European Pat. Off. | 502/214 |
| 1496181 | 8/1975 | United Kingdom | 502/64 |

OTHER PUBLICATIONS

Lok et al., J. Am. Chem. Soc., 1984, 106, 6092-6093.
*Petroleum Refining*, by Gary and Handwerk, Chapter 13.
"Selective Hydrocracking of n-Paraffins in Jet Fuels", by Chen and Garwood (1978).
"New Process Cuts Pour Point of Distillates" by Chen et al. (Oil & Gas Journal, 1977).
*Chemical Industry Press*, vol. 2, pp. 703-713, paper presented by Meisel of Mobil (Beijing, Peoples Republic of China, 1982).
"Hydrodewaxing of Fuels and Lubricating Using ZSM-5 Type Catalysts," by Graven et al., a 1980 Paper from Fuels for the Future (Aus. Inst. of Petroleum, 1980).
Derouane, "Molecular Shape Selective Catalysts by Zeolites," Zeolites: Science and Technology, Martin & Nohoff Publication, pp. 347-371, 1983, 24555, N3.
The Chemistry of Catalytic Hydrocarbon Conversions by Herman Pines, Academic Press (1981).
Zeolite Molecular Sieves, Donald W. Breck (1974), John Wiley & Sons, Inc., p. 529.

*Primary Examiner*—Anthony McFarlane
*Attorney, Agent, or Firm*—Vincent J. Vasta, Jr.; Thomas K. McBride

[57] ABSTRACT

Dewaxing processes for hydrocarbon feedstocks are disclosed using novel catalysts comprising specific silicoaluminophosphates of U.S. Pat. No. 4,440,871. The products of the instant dewaxing processes are characterized by lower pour points than the hydrocarbon feedstock.

42 Claims, 4 Drawing Sheets

U.S. PATENT DOCUMENTS

| | | | |
|---|---|---|---|
| 4,456,780 | 6/1984 | Young | 585/475 |
| 4,486,296 | 12/1984 | Oleck et al. | 208/111.11 C |
| 4,499,327 | 4/1985 | Kaiser | 585/640 |
| 4,500,651 | 2/1985 | Lok et al. | 502/208 |
| 4,512,875 | 4/1985 | Long et al. | 208/114 |
| 4,551,236 | 11/1985 | Lok et al. | 208/112 |
| 4,554,143 | 11/1985 | Messina et al. | 423/306 |
| 4,567,029 | 1/1986 | Wilson et al. | 502/150 |
| 4,588,846 | 5/1986 | Mitsui et al. | 568/750 |
| 4,605,790 | 8/1986 | Wojtkowski | 568/835 |
| 4,666,875 | 5/1987 | Pellet et al. | 502/214 |
| 4,683,050 | 7/1987 | Ward | 208/110 |
| 4,686,029 | 8/1987 | Pellet et al. | 208/18 |
| 4,695,365 | 9/1987 | Ackelson | 208/89 |
| 4,710,485 | 12/1987 | Miller | 502/219 |
| 4,734,185 | 3/1988 | Pellet et al. | 208/120 |
| 4,758,419 | 7/1988 | Lok et al. | 423/306 |
| 4,764,269 | 8/1988 | Edwards et al. | 208/120 |
| 4,859,311 | 8/1989 | Miller | 208/18 |
| 4,880,760 | 11/1989 | Pellet et al. | 502/67 |
| 4,906,351 | 3/1990 | Pellet et al. | 208/114 |

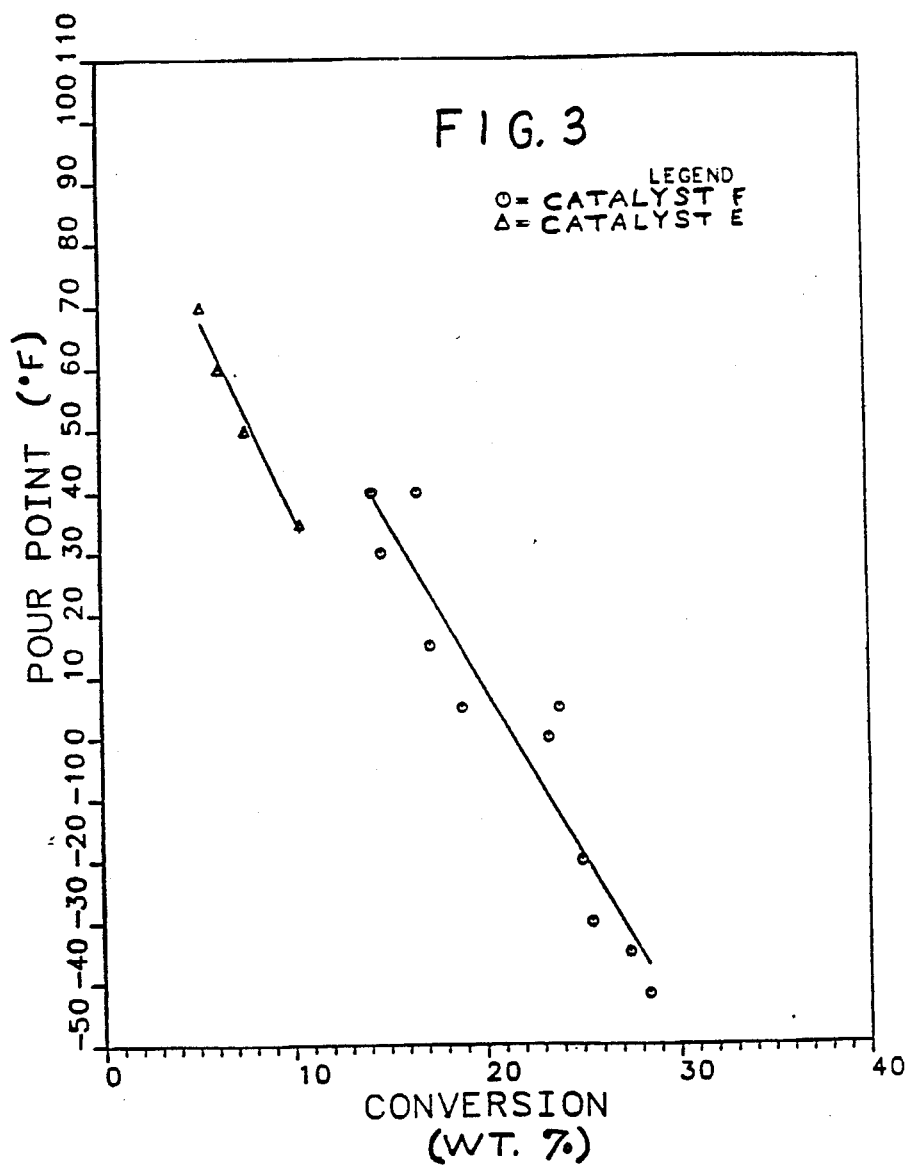

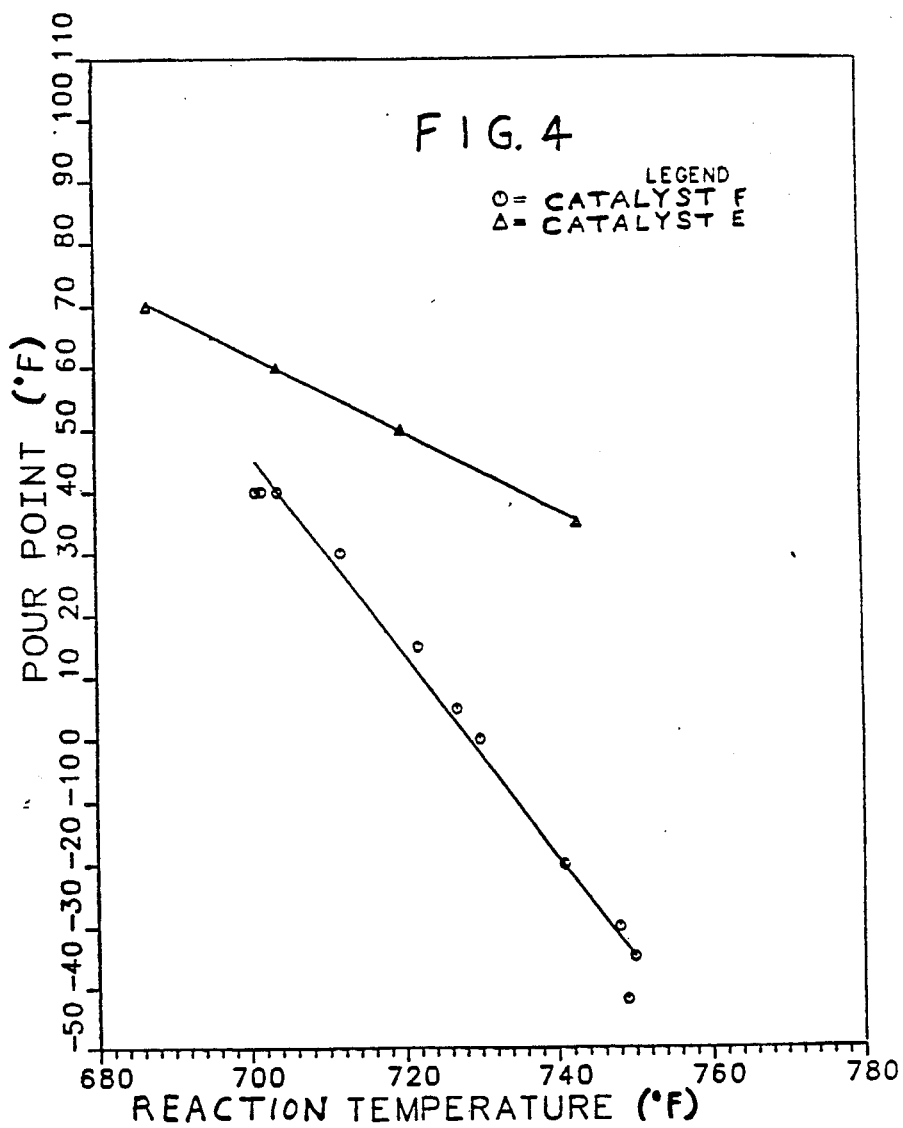

DEWAXING CATALYSTS AND PROCESSES EMPLOYING SILICOALUMINOPHOSPHATE MOLECULAR SIEVES

CROSS-REFERENCE TO RELATED APPLICATION

This application is a continuation-in-part of Application Ser. No. 683,246, filed Dec. 18, 1984, pending.

FIELD OF THE INVENTION

The present invention relates to dewaxing and hydrodewaxing catalysts comprising silicoaluminophosphate molecular sieves, as hereinafter described, and to processes employing such catalysts.

BACKGROUND OF THE INVENTION

Dewaxing and hydrodewaxing processes are principally employed in the refining industry to treat petroleum fractions having initial boiling points over about 350° F. and relatively high pour points to improve (i.e., reduce) their pour points. The improvement in pour point is generally effected by selective removal of high boiling or waxy paraffinic hydrocarbons. Since the pour points of lubricating oils and liquid hydrocarbon fuels, e.g., diesel fuels and other light gas oil fractions, are strictly controlled, the pour point specifications of such lubricants and fuels must be met if such are to be employed in their intended use.

The need to reduce the pour point of petroleum fractions has resulted in the development of numerous dewaxing and hydrodewaxing processes wherein the pour points of petroleum fractions are reduced by selective removal of high boiling or waxy paraffinic hydrocarbons. Processes relating to dewaxing and hydrodewaxing are well known in both the patent and scientific literature. See, for example, Gary and Handwerk, PETROLEUM REFINING TECHNOLOGY AND ECONOMICS. Second Edition (Marcel Dekker, New York, 1984), pages 241 to 245, in which lubricating oils are described as being dewaxed by selective hydrocracking processes which crack the wax molecules to light hydrocarbons. Two types of selective hydrocracking processes are described -- one using a single catalyst for pour point reduction only (See Hargrave et al., *Oil & Gas Journal* Vol. 77(2), pp. 103–105, 1979), the other using two catalysts to reduce the pour point and improve the oxygen stability of the product (See Smith et al., *Oil & Gas Journal* Vol. 78(2), pp. 75–84, 1980). Both processes are said to employ for the pour point reduction operation synthetic shape-selective zeolite catalysts which selectively crack the n-paraffins and slightly branched paraffins. Zeolites with pore openings about 6 Angstroms in diameter are said to provide rapid cracking rates for n-paraffins, with the rates decreasing rapidly as the amount of branching increases. Certain zeolites are known to concentrate hydrocarbon reactants within the zeolite crystal; see applicant Rabo's "Unifying Principles in Zeolite Chemistry and Catalysis," Catalysis Review - Science & Engineering, Vol. 23, p. 299 (1981).

Such dewaxing processes have employed crystalline aluminosilicates as catalysts. For example, see U.S. Pat. Nos. 3,140,249, 3,140,252, 3,140,251, 3,140,253, 3,956,102 and 4,440,991. These and other patents disclose the use of various crystalline aluminosilicates as catalysts for dewaxing processes. U.S. Pat. No. 4,428,825 describes catalytic dewaxing as a method wherein a waxy feedstock is contacted with a suitable catalyst under conditions such that the waxy paraffins therein are cracked to form other hydrocarbons having less effect upon the pour point. The catalysts used (comprising silicalite) are said to be highly selective for cracking waxy components and often possess hydrogenation activity such that, in the presence of hydrogen, the cracked components are saturated by hydrogenation essentially immediately. Such catalysts are termed "hydrodewaxing" catalysts, and methods of dewaxing in such manner are known as "hydrodewaxing". Such processes are described in related U.S. Pat. No. 4,428,862 as preferably selectively hydrocracking and removing waxy paraffins while not substantially hydrocracking other components or substantially altering the boiling characteristics of the feedstock being treated, particularly with respect to the heavy fractions thereof.

Thus, for reducing the pour points of hydrocarbon feedstocks containing waxy or excessively high boiling components, processes and catalysts are needed which are capable of selectively converting these waxy components (i.e., generally n-paraffins of relatively high molecular weight and other components having very high boiling points) to achieve the necessary reductions in pour point (usually substantial, to produce products suitable for lubricating oils, fuel oils and the like) while leaving the boiling range and molecular weight distribution of the products substantially unchanged from those of the feedstock. While increasing amounts of the desired products as well as the waxy components may be converted under the relatively severe conditions required to produce large reductions in pour point, the objective is generally to achieve substantial reductions in pour point (at least to achieve product specifications) without substantial conversion of the nonwaxy components of the feedstock, since the latter represents a loss in yield.

Although a large number of zeolite materials have been disclosed as employable as catalysts for dewaxing and hydrodewaxing processes, the use of other crystalline molecular sieves has not received attention. This lack of attention is attributable to the scarcity of molecular sieves other than crystalline aluminosilicates. One disclosure of a catalyst containing a crystalline silicate, as opposed to a crystalline aluminosilicate, is found in U.S. Pat. No. 4,441,991. See also U.S. Pat. No. 4,428,825 and related U.S. Pat. No. 4,428,862, which utilize catalysts comprising silicalites.

The instant invention provides for catalytic dewaxing and hydrodewaxing of hydrocarbon feedstocks by contacting such with catalysts comprising silicoaluminophosphate molecular sieves, as hereinafter described.

BRIEF DESCRIPTION OF THE DRAWINGS

FIG. 3 is a plot of the pour point (°F) as a function of conversion of Catalyst E (SAPO-11) and comparative Catalyst F (Silicalite).

FIG. 4 is a plot of the pour point (°F) as a function of reactor temperature (.F) of Catalyst E (SAPO-11) and comparative Catalyst F (Silicalite).

SUMMARY OF THE INVENTION

Figure 1:
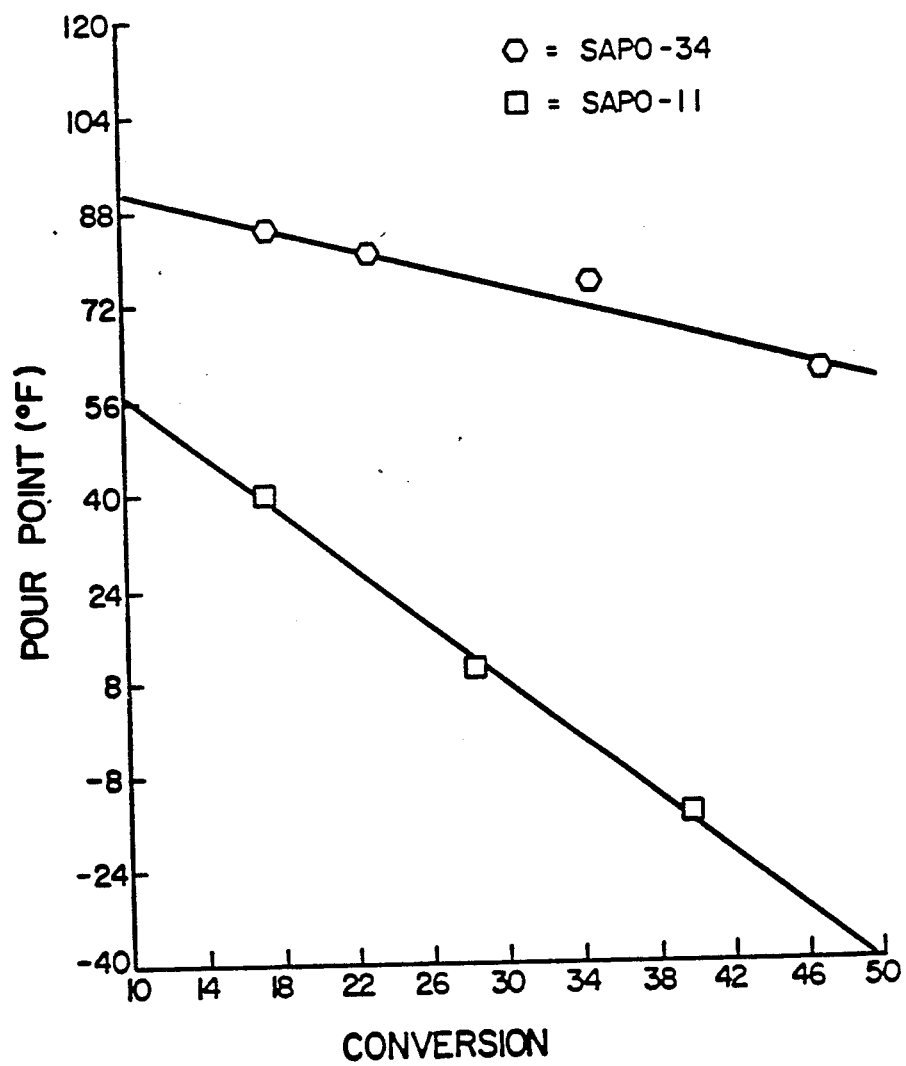
FIG. 1 is a plot of the pour point (°F) as a function of conversion of Catalyst A (SAPO-11) and comparative Catalyst C (SAPO-34).

The present invention relates to catalytic dewaxing and hydrodewaxing (hereinafter jointly referred to as "dewaxing") processes and the catalysts employed in such processes. The catalysts comprise: 1) at least one medium or large pore silicoaluminophosphate molecular sieve, as hereinafter described; and 2) optionally, in the process of hydrodewaxing, for example, at least one hydrogenation component. The catalysts of this invention may optionally contain particles of a traditional dewaxing catalyst having catalytic activity for dewaxing and/or hydrodewaxing hydrocarbon feedstocks at effective dewaxing conditions, e.g., particles of a traditional dewaxing catalyst containing a zeolitic aluminosilicate(s) of the type generally employed in such dewaxing catalysts. The silicoaluminophosphate molecular sieves employed in the instant invention, i.e., catalysts and processes, are disclosed in U.S. Pat. No. 4,440,871 and are characterized in their calcined form (i.e., with template removed) by an adsorption of isobutane of at least 2 percent by weight at a partial pressure of 500 torr and a temperature of 20° C. The application of this criterion excludes small pore species. The traditional dewaxing catalyst component, e.g., a zeolitic aluminosilicate, if any, is characterized as being a dewaxing catalyst acid cracking component, such as heretofore traditionally employed in dewaxing processes, e.g., the various forms of zeolite Y, mordenite, ZSM-5 and the like, optionally employed with silica-alumina (as a matrix) and hydrogenation components. The silicoaluminophosphate molecular sieves employed in this invention are unique in that such are not zeolitic aluminosilicates, as heretofore employed in the prior art, but are specific silicoaluminophosphate molecular sieves, as hereinafter described.

In accordance with the invention, an improved process for catalytically dewaxing a hydrocarbon feedstock (boiling above 350° F. and containing high boiling and high pour point paraffinic waxes and hydrocarbons) comprising selective conversion of paraffinic waxes and hydrocarbons is provided, which process comprises contacting the feedstock at effective dewaxing conditions with a dewaxing catalyst comprising an amount of at least one SAPO effective in reducing the pour point of the feedstock, with the SAPO characterized in calcined form by an adsorption of isobutane of at least 2 percent by weight at a pressure of 500 torr and a temperature of 20° C, the catalyst further comprising an inorganic oxide matrix component as from 0 to about 99 weight percent of the total catalyst weight, the process being carried out so as to produce products having a reduced pour point relative to the hydrocarbon feedstock. Similarly, an improved process for catalytically hydrodewaxing similar feedstocks involves contacting the feedstock in the presence of hydrogen under effective hydrodewaxing conditions with such a dewaxing catalyst which further comprises a hydrogenation component selected from suitable metals so as to produce products having a reduced pour point. In preferred embodiments, the SAPO in the dewaxing or hydrodewaxing catalysts is selected from the group consisting of SAPO-5, SAPO-11, SAPO-31, SAPO-37, SAPO-40 and SAPO-41. In certain embodiments, processes are provided for catalytically reducing the pour points of the feedstocks described above without substantial conversion of the feedstock to products of lower boiling point than the initial boiling point of the feedstock, comprising the step of contacting the feedstock under effective reaction conditions with a catalyst as described above, so as to produce products having a substantially reduced pour point relative to the feedstock without a substantial portion of the feedstock being converted to obtain the observed reduction in pour point. When the feedstock is contacted with the catalyst in the presence of hydrogen, a hydrogenation component is preferably present in the catalyst. Using these processes, it is found that less of the feedstock is converted for corresponding reductions in pour point than with the use of traditional zeolite or silicalite dewaxing catalysts.

DETAILED DESCRIPTION OF THE INVENTION

Dewaxing and hydrodewaxing processes generally involve selectively converting high boiling and high pour point paraffinic waxes and hydrocarbons (such as n-paraffins and slightly branched paraffins of high molecular weight) to lower boiling and lower pour point products. That is, the waxy components in a hydrocarbon feedstock are converted to materials of markedly reduced pour point and (usually) boiling point, resulting in products having lower pour points than the feedstock. Further, hydrodewaxing involves hydrogenating unsaturates in the product. The term "dewaxing" is employed herein to generally mean the selective transformation, conversion and removal of hydrocarbons which readily solidify from petroleum stocks as waxes and includes catalytic dewaxing and hydrodewaxing. In this context, the transformation of waxy hydrocarbons can include fragmentation reactions such as cracking, in which smaller molecules of lower boiling point are formed and generally removed from the product, and structural molecular rearrangements such as isomerization, in which molecules of substantially the same molecular weight and boiling point, but reduced pour point, are formed. The catalysts of the instant invention have been observed to convert feedstocks of high pour point to low pour point products with only modest or insubstantial conversion of the feedstock to lower boiling products. The catalysts are believed to achieve this effect primarily by selective conversion of waxy normal paraffins in the hydrocarbon feedstocks and, accordingly, reduction of the pour points of the products, i.e., by acting as dewaxing catalysts. This reduction in the pour point by selective normal paraffin conversion is of commercial significance since most distillate products have rigid specifications on the acceptable pour point. Using the processes and catalysts of the present invention, the hydrocarbon products are found to have substantially reduced pour points relative to the feedstock, without a proportionately substantial portion of the feedstock being converted to products of lower boiling point. The effectiveness of dewaxing catalysts and processes can be graphically evaluated by plotting the pour point of the products versus the conversion of the feedstock (as in FIGS. 1 through 4), with the steepness of the downward slope indicating the amount of pour point reduction obtained per unit of feedstock conversion. While the absolute values of pour points and slopes attained will, of course, vary widely with the feedstocks, catalysts and reaction conditions employed, such plots permit easy comparisons of different catalysts and process conditions for dewaxing. Since larger reductions in pour point require progressively more severe conditions involving increased conversion of the feedstock, a substantial reduction in pour point relative to the feedstock without a proportionately substantial portion of the feedstock being converted to products of lower boiling point is a relative criterion in which the degree of feedstock conversion required to achieve the desired reduction in pour point is less than would be expected in prior art processes. In other words, an enhanced reduction in pour point is attained per unit degree of conversion. For example, as indicated by the examples herein, the present invention permits a hydrocarbon feedstock to be catalytically dewaxed so that reductions in pour point of at least about one degree Fahrenheit are obtained per unit percent conversion of the feed to products of lower boiling point. Thus, hydrocarbon feedstocks can be dewaxed to produce products whose pour point is at least 30° F. less than the pour point of the feedstock, while less than about 15 percent of the feedstock is converted to products of lower boiling point; products having pour points at least 50° F. less than the pour point of the feedstock can be produced while less than about 40 percent of the feedstock is converted; and products having pour points at least 80° F. less than the pour point of the feedstock can be produced while less than about 50 percent of the feedstock is converted. By minimizing the proportion of the feedstock which is converted to materials of lower boiling point the yield of the product of reduced pour point is maximized.

The silicoaluminophosphate molecular sieves employed in the instant invention are selected from the hereinafter described group of silicoaluminophosphate molecular sieves as being characterized in their calcined form by an adsorption of isobutane of at least 2 percent by weight at a partial pressure of 500 torr and a temperature of 20° C, thus excluding small pore species. The silicoaluminophosphate molecular sieves are preferably also characterized in their calcined form by an adsorption of triethylamine of from zero to less than 5 percent by weight, preferably less than .3 percent by weight, at a partial pressure of 2.6 torr and a temperature of 22° C. The application of this criterion excludes large pore species.

Silicoaluminophosohate Molecular Sieves

The silicoaluminophosphate molecular sieves of U.S. Pat. No. 4,440,871 and copending Application Ser. No. 575,745, filed Jan. 31, 1984 (referred to therein as "SAPOs") are microporous crystalline silicoaluminophosphates, the pores of which are uniform and have nominal diameters of greater than about 3 Angstroms and whose essential empirical chemical composition in the as-synthesized and anhydrous form is

wherein "R" represents at least one organic templating agent present in the intracrystalline pore system; "m" represents the moles of "R" present per mole of $(Si_xAl_yP_z)O_2$; "m" has a value of from 0.02 to 0.3; "x", "y" and "z" represent the mole fractions of silicon, aluminum and phosphorus respectively, present as tetrahedral oxides, said mole fractions being such that they are within the pentagonal compositional area defined by points A, B, C, D and E of the ternary diagram which is FIG. 1 of the drawings of U.S. Pat. No. 4,440,871. The SAPO molecular sieves of U.S. Pat. No. 4,440,871 are also described as silicoaluminophosphates having a three-dimensional microporous framework structure of $PO_2^+$, $AlO_2^-$ and $SiO_2$ tetrahedral units, and whose essential empirical chemical composition on an anhydrous basis is:

wherein "R" represents at least one organic templating agent present in the intracrystalline pore system; "m" represents the moles of "R" present per mole of $(Si_xAl_yP_z)O_2$ and has a value of from zero to 0.3; "x", "y" and "z" represent respectively, the mole fractions of silicon, aluminum and phosphorus present in the oxide moiety, said mole fractions being within the pentagonal compositional area bounded by points A, B, C, D and E on the ternary diagram which is FIG. 1, said silicoaluminophosphate having a characteristic X-ray powder diffraction pattern which contains at least the d-spacings set forth below in any one of Tables I, III, V, VII, IX, XII, XV, XVII, XXI, XXIII or XXV of U.S. Pat. No. 4,440,871.

Further, such crystalline silicoaluminophosphates may be calcined at a temperature sufficiently high to remove at least some of any organic templating agent present in the intracrystalline pore system. These crystalline silicoaluminophosphates can be calcined, hydrotreated (i.e., steam treated) or chemically treated to remove at least a portion of the template or, alternatively, can be calcined, hydrotreated or chemically treated in situ prior to carrying out the dewaxing process. Thus, stating that a particular species is characterized in the calcined form by a certain adsorption criterion (or criteria) is equivalent to characterizing that species after removal of the template by calcining or other means. The silicoaluminophosphates of U.S. Pat. No. 4,440,871 are generally referred to therein as "SAPOs", as a class, or as "SAPO-n" wherein "n" is an integer denoting a particular SAPO species as its preparation and properties are reported in U.S. Pat. No. 4,440,871.

SAPO CATALYSTS

The specific SAPOs employed in the instant invention are characterized in their calcined form by an adsorption of isobutane of at least 2 percent by weight at a partial pressure of 500 torr and a temperature of 20° C. The SAPOs are preferably also characterized in their calcined form by an adsorption of triethylamine of less than 5 percent by weight at a partial pressure of 2.6 torr and a temperature of 22° C. SAPOs characterized by the above described adsorption of isobutane include, but are not limited to, SAPO-5, SAPO-11, SAPO-31, SAPO-37, SAPO-40, SAPO-41, and mixtures thereof.

The above characterization of the SAPOs employed in the instant invention relates to an adsorption characterization that is carried out on a SAPO which has been subjected to a post synthesis treatment, e.g., calcination or chemical treatment, to remove a substantial portion of the template "R" which is present as a result of synthesis. Although a particular SAPO is characterized herein by reference to its adsorption of isobutane or triethylamine as relating to the adsorption characteristics of the SAPO in its calcined form, in which the template is removed, the instant invention necessarily includes the use of non-calcined or modified SAPOs which are characterized by such adsorption in the modified or calcined form, since upon use of such a non-calcined SAPO in the instant process at effective dewaxing conditions the SAPO will be calcined or hydrothermally treated in situ so as to have the characteristic adsorption of isobutane or triethylamine. Thus, the SAPO will be rendered in situ to a form characterized by the aforementioned adsorption characteristics after removal of the template. For example, an as-synthesized SAPO-11 is not characterized by the aforementioned adsorption of isobutane due to the presence of template "R" which is present as a result of synthesis, although the calcined form of SAPO-11 is characterized by the aforementioned adsorption of isobutane. Thus, reference to a SAPO having a particular adsorption characteristic in its calcined form is not intended to exclude the use of the SAPO in its as-synthesized form which upon in-situ calcination, hydrothermal treatment and/or other treatment resulting in the removal of the template, e.g., ion exchange with suitable atoms, would have such adsorption characteristics.

The SAPOs of the instant invention may be employed in conjunction with traditional dewaxing catalysts and hydrocracking catalysts and accordingly, optionally, a zeolitic aluminosilicate component such as a crystalline zeolite or zeolite-derived material may be employed in conjunction with the SAPO-containing catalysts. The zeolitic aluminosilicate component of such catalysts may be any aluminosilicate heretofore employed as a component in dewaxing catalysts. Representatives of the zeolitic aluminosilicates disclosed heretofore as employable as component parts of traditional dewaxing catalysts are Zeolite Y (U.S. Pat. No. 3,130,007), steam stabilized Zeolite Y (ultra-stable Y; see, e.g., U.S. Pat. No. 3,293,192), Zeolite X, Zeolite beta (U.S. Pat. No. 3,308,069), Zeolite KZ-20 (U.S. Pat. No. 3,445,727), Zeolite ZSM-3 (U.S. Pat. No. 2,014,970, June 9, 1982), ZSM-type zeolites, erionite, mordenite, offretite, chabazite, FU-1-type zeolite, NU-type zeolites and mixtures thereof. Traditional dewaxing catalysts containing amounts of $Na_2O$ less than about one percent by weight are generally preferred.

Another zeolitic aluminosilicate employable herein is "LZ-210", as described in E.P.C. Publication No. 82,211 published June 29, 1983, incorporated herein by reference thereto, and in U.S. Pat. No. 4,503,023. In one embodiment the hydrocracking catalyst disclosed in copending U.S. Ser. No. 490,951, filed May 2, 1983, incorporated herein by reference, may be employed as an optional LZ-210 containing hydrocracking component.

The term "ZSM-type" zeolites is generally employed in the art to refer to those zeolites denominated by the nomenclature "ZSM-n" where "n" is an integer. The ZSM-type aluminosilicates include but are not limited to ZSM-5, ZSM-11, ZSM-12, ZSM-23, ZSM-35, ZSM-38, ZSM-48; and other similar materials. For example, as disclosed in U.S. Pat. No. 4,309,279 to Chester, column 10, various naturally-occurring zeolites can be treated by various processes so that their properties meet the specifications of certain species of the ZSM-n series.

ZSM-5 is described in greater detail in U.S. Pat. No. 3,702,886 and Re 29,948. The entire descriptions contained within those patents, particularly the X-ray diffraction pattern of therein disclosed ZSM-5, are incorporated herein by reference.

ZSM-11 is described in U.S. Pat. No. 3,709,979. That description, and in particular the X-ray diffraction pattern of said ZSM-11, is incorporated herein by reference.

ZSM-12 is described in U.S. Pat. No. 3,832,449. That description, and in particular the X-ray diffraction pattern disclosed therein, is incorporated herein by reference.

ZSM-23 is described in U.S. Pat. No. 4,086,842. The entire contents thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern hereof, is incorporated herein by reference.

ZSM-48 is more particularly described in U.S. Pat. No. 4,423,021. The description of that zeolite, and particularly the specified X-ray diffraction pattern thereof, is incorporated herein by reference.

In addition, crystalline silicates such as silicalite (U.S. Pat. No. 4,061,724) may be employed with the SAPOs of the instant invention.

FORMULATION OF DEWAXING CATALYSTS

The catalysts of the instant invention comprise at least one selected medium or large pore SAPO, as above characterized, and optionally, may also contain a hydrogenation catalyst and optionally, one or more traditional dewaxing or hydrocracking catalysts, including zeolitic aluminosilicate components. The specific SAPO species chosen and the relative amounts of the SAPO component or traditional dewaxing component, if any, will depend, at least in part, on the selected hydrocarbon feedstock and on the desired pour point of the product, but in all instances an effective amount of at least one SAPO is employed. When a zeolitic aluminosilicate is employed as a part of the traditional dewaxing component the relative weight ratio of the zeolitic aluminosilicate to the SAPO is generally between about 1:0 and about 500:1, desirably between about 1:10 and about 200:1, preferably between about 1:2 and about 50:1, and most preferably between about 1:1 and about 20:1. The zeolitic aluminosilicate and/or SAPO may be ion-exchanged with a selected cation(s) and/or thermally treated either before or after mixture with each other or after such have been added separately or concurrently to one or more inorganic oxide matrix components. When the SAPO molecular sieves are ion exchanged such are preferably exchanged with a hydrogen-forming cation species, e.g. $NH_4^+$, $H^+$, quaternary ammonium cations, etc. The SAPO preferably has at least part of its cations as hydrogen-forming cation species.

The hydrodewaxing catalysts of the invention may optionally contain a hydrogenation component of the type commonly employed in dewaxing catalysts. The hydrogenation component may be selected from the group of hydrogenation catalysts consisting of one or more metals of Group VIB and Group VIII, including the salts, complexes and solutions containing such metals. The preferred hydrogenation catalyst is at least one of the metals and their compounds, salts and complexes selected from the group consisting of platinum, palladium, rhodium, and iridium or at least one from the group consisting of nickel, molybdenum, cobalt, tungsten, titanium, and chromium. As recognized in the art, the noble and base metals will not generally be employed in the same catalyst system. Reference to the catalytically active metal or metals is intended to encompass such metal or metals in the elemental state or in some form such as an oxide, sulfide, halide, carboxylate and the like.

When the hydrogenation catalyst is a noble metal it is generally present in an amount between about 0.05 and about 1.5 percent by weight based on the total weight of the dewaxing catalyst including the weight of any binder or matrix material which may be present, as hereinafter discussed, although effective amounts outside this range may be employed. Although effective amounts in excess of 1.5 percent by weight may be employed, the preferred effective amount of the noble metal hydrogenation component is between about 0.3 and about 1.2 percent by weight. When the hydrogenation catalyst is a base metal(s) the effective amount will generally be between about 1.0 and about 30 percent by weight or more of the base metal, expressed as the oxide(s), based on the total weight of the dewaxing catalyst, although effective amounts outside this range may be employed.

The final form of the hydrogenation component is not narrowly limited herein but may be a metal oxide, metal sulfide or other catalytically active form. Since sulfur is typically present in the hydrocarbon feedstock being treated, the actual form of some of the hydrogenation component(s) may well be at least in part a sulfide due to in situ reactions. When a noble metal is employed as the hydrogenation component the catalyst is generally activated in air and then reduced in a hydrogen atmosphere. When base metals are employed such are usually treated with a sulfur compound.

The hydrogenation components can be incorporated into the overall catalyst composition by any one of numerous procedures. In general it has been observed in this invention that it is possible to add the hydrogenation component to the catalyst as a separate component rather than provide such by ion exchange or impregnation of the SAPO component. They can be added either to the SAPO component, zeolitic aluminosilicate component, if any, or to any metal oxide or to a combination thereof by ion exchange, impregnation, occlusion and the like. In the alternative, multiple hydrogenation components (two or more) may be added as powders in the formulation of the catalyst. They may be added by co-mulling, impregnation, co-precipitation or ion exchange whereby one or more component may be added to the SAPO and/or zeolitic aluminosilicate by impregnation, co-mulling, ion exchange or co-precipitation. For example, noble or base metal compounds, such as the sulfides, oxides or water-soluble salts, can be added by co-mulling, impregnation or precipitation before the composite is finally calcined. In the alternative these components can be added to the finished particle by impregnation with an aqueous, alcoholic, hydrocarbon or other nonaqueous solution of soluble compounds or precursors.

Although the hydrogenation components can be combined with the SAPO and/or zeolitic aluminosilicate, if any, as the oxides, such is generally not the case. They are usually added as a metal salt which can be thermally converted to the corresponding oxide in an oxidizing atmosphere or reduced to the metal with hydrogen or other reducing agent. The composition can be sulfided by reaction with a sulfur donor such as carbon disulfide, hydrogen sulfide, hydrocarbon thiols, elemental sulfur, and the like. The above oxidizing or sulfiding processes are generally carried out on catalyst compositions which have been partially dried (as desired), tableted, pelleted, extruded (with binder or matrix), or formed by other means and then calcined, e.g., at a temperature above 600° F, usually above 800° F.

It is well known in the art that dewaxing catalysts are generally employed with a binder material or, as commonly referred to, with an inorganic oxide matrix which can be inert or also catalytically active. For example inorganic matrices such as silica, alumina, silica-alumina, silica-zirconia, silica-magnesia, alumina-boria, alumina-titania and the like, and mixtures thereof, may be employed. An inorganic oxide need not always be employed, such as in the case of a preform containing the SAPO, or may be employed in an amount between about 1 percent and about 95 percent by weight, preferably between about 10 percent and about 80 percent by weight, based on the total weight of the dewaxing catalyst.

The term "crude oil feedstock" is used herein to denominate any crude oil feedstock or portion thereof and includes full range crude oils from primary, secondary or tertiary recovery from conventional or offshore oil fields and to the myriad of hydrocarbon feedstocks derived therefrom, including lube oils, diesel fuel oils, heating fuel, jet fuel, kerosene, turbine fuel oils and the like. "Crude oil feedstocks" may also be "syncrudes" such as those that can be derived from coal, Fisher Tropsch fuel products, shale oil, tar sands and bitumens. The crude oil feedstock may be virgin (straight run) or generated synthetically by blending. Such crude oil feedstocks are traditionally desalted prior to use, since sodium chloride is known to be a poison in many dewaxing operations. Further, the term "crude oil feedstocks" is intended to include component parts of crude oils which have heretofore been generally employed as feedstocks or potential feeds and includes feeds such as distillate gas oils, vacuum gas oils, atmospheric and vacuum residual oils, syncrudes, pulverized coal and fractions boiling above the traditional end of the gasoline boiling range which generally includes compounds containing greater than about eleven carbon atoms and combinations thereof. Since heavy lubricating oil feedstocks are typically residual oils, dewaxing of lubricating oils will generally be carried out on residual oils rather than distillates. The boiling point ranges for lubricating oil feedstocks vary widely with type, but are generally above 700° F, in most cases above about 1000° F.

The hydrocarbon feedstock for dewaxing distillates typically boils above 350° F, preferably between about 400° F. and 1200° F, and more preferably between about 400° F. and about 900° F. Feedstocks suitable for dewaxing typically have pour points higher than desired, e.g., lube oil feedstocks with pour points higher than the temperatures at which the lube oil products are to be employed. The hydrocarbon feedstock may be pre-treated in a hydrotreater to reduce, i.e. remove, compounds which contain sulfur and/or nitrogen. The hydrocarbon feedstock may have a significant sulfur content, present as hydrogen sulfide, ranging from 0.1 to 3 weight percent, and nitrogen content, present as ammonia, in an amount up to about 20,000 ppm, or even more. Temperature, space velocity, and other process variables may be adjusted to compensate for the effects of nitrogen on the dewaxing catalyst activity The feedstock is contacted in the dewaxing reaction zone with the dewaxing catalyst and, optionally, in the presence of hydrogen-containing gas and/or a hydrogen generating compound. In hydrodewaxing, hydrogen is consumed in the hydrodewaxing process and an excess of hydrogen is typically maintained in the reaction zone. Advantageously, a hydrogen-to-oil (feed) ratio of at least 1,000 standard cubic feet of hydrogen per barrel of feed (SCFB) is employed, and the hydrogen-to-oil ratio may range up to 20,000 SFCB. Preferably, about 4,000 to 12,000 SCFB is employed. Typical dewaxing and hydrodewaxing conditions are disclosed in U.S. Pat. No. Re 28,398, U.S. Pat. No. 3,852,189 and U.S. Pat. No. 4,282,085.

The instant process is carried out under effective catalytic dewaxing or hydrodewaxing conditions. Catalytic dewaxing is generally carried out at a LHSV (liquid hourly space velocity) between about 0.2 and about 50, a temperature between about 500° F. and about 1200° F, a pressure between about subatmospheric and about 500 atmospheres. Hydrodewaxing is generally carried out at a LHSV between about 0.1 and about 15, a temperature between about 400° F. and about 900° F, at a pressure between about 10 psig and about 2500 psig and using molar ratios of hydrogen to hydrocarbon feedstock between about 1 and about 100.

EXAMPLES

The following examples were carried out to demonstrate the use of the dewaxing catalysts and dewaxing processes of the invention and are not intended to be limiting thereof. In contrast to these examples, numbered with Arabic numerals, the comparative examples numbered with Roman numerals do not illustrate processes of the present invention. Comparison of the examples and comparative examples illustrates that the processes of the present invention are capable of dewaxing suitable hydrocarbon feedstocks to produce high yields of products having lower pour points with high selectivity. Comparison of the examples and comparative examples illustrates that the processes of the present invention are capable of reducing the pour point of a feedstock while minimizing the undesirable conversion of that feedstock to lighter cracked components and the alteration of its boiling point range. The examples also illustrate the surprising and superior performance of the catalysts of the present invention whose molecular sieve components are characterized by the adsorption criteria and framework chemical composition as defined by this invention. This surprising and superior performance is contrasted with the performance of the comparative catalysts, whose molecular sieve components do not meet these criteria.

Examples 1 and 2 and Comparative Example I

Three catalysts were prepared for evaluation as dewaxing catalysts and were denominated Catalysts A, B and C. All weights are given as anhydrous weights unless otherwise designated. The catalysts were prepared as follows:

(a) Catalyst A is a catalyst according to the invention and was prepared using SAPO-11. SAPO-11 was prepared according to Example 17 of U.S. Pat. No. 4,440,871, except that the digestion time was 24 hours. Catalyst A was prepared by blending 80 grams of SAPO-11 with 80 grams of a nickel-tungsten-alumina catalyst, 100 grams of a silica solution (40 percent by weight silica in water) and an ammonium acetate solution (4 grams of ammonium acetate in 70 cubic centimeters (cc) of water). The mixture was extruded as 1/16 inch extrudates and dried at 100° C. for about 16 hours and calcined in air at 500 C. for 2 hours. The calcination at 500° C. was carried out in a stepwise manner by heating the catalyst from room temperature to 220° C. over a one hour period, heating the catalyst at 220° C. for 1.5 hours, heating the catalyst from 220° C. to 500° C. over a one hour period and then heating the catalyst at 500° C. for 2 hours. The nickel-tungsten-alumina hydrogenation component was prepared by pore filling 85 grams of a pseudoboehmite alumina with an aqueous solution (119 cc) containing 31.5 grams of $Ni(NO_3)_2 \cdot 6\text{-}H_2O$ and 33.7 grams ammonium metatungstate. The mixture was dried as above described for Catalyst A except the final temperature was 480° C. instead of 500° C. Catalyst A, expressed as the weight percent oxides, was prepared to be: 35% SAPO-11, 35% $Al_2O_3$, 17% $SiO_2$, 3% NiO and 10% $WO_3$. Chemical analysis of Catalyst A for NiO and W03 gave 2.8 wt. % NiO and 9.6 wt. % W03.

(b) Catalyst B was prepared according to this invention using a SAPO-31 prepared according to Example 51 of U.S. Pat. No. 4,440,871. SAPO-31 (72 grams) was blended with 46.5 grams of an aqueous silica solution (40 wt % silica). The mixture was extruded into 1/16 inch pellets which were dried at 100° C. and calcined at 500° C, by the procedure above described for Catalyst A. The calcined extrudates were treated in air (saturated with water at 25° C.) at 650° C. for three hours. The chemical composition of the catalyst was prepared to be 80 wt.% SAPO-31 and 20 wt. % $SiO_2$. Metal hydrogenation components were not added.

(c) Catalyst C. is a comparative catalyst (for Comparative Example I) and was prepared using SAPO-34. SAPO-34 was prepared according to the procedure of examples 32 to 38 of U.S. Pat. No. 4,440,871. SAPO-34 is not characterized by an isobutane adsorption of at least 2 percent by weight at a partial pressure of 500 torr and a temperature of 20° C, whereas SAP0-11 and SAPO-31 are so characterized. Catalyst C. was prepared by mixing 30 grams of SAPO-34 with 50 grams of an alumina sold under the trade designation "PA" by American Cyanamid, Stamford, CT., and 20 grams of a pseudoboehmite alumina. The above mixture was mixed with 3 cc of concentrated nitric acid and 50 cc of water and extruded as 1/16 inch extrudates. The extrudates were dried at 100° C. and calcined at 500° C. by the procedure above described for Catalyst A. The extrudates (53 grams) were pore filled by mixing them with a solution (35 cc) containing 10.7 grams of $Ni(NO_3)_2 \cdot 6\text{-}H_2O$ and 20.9 grams of ammonium metatungstate. The extrudates were then dried at 500° C. as above described for Catalyst A. Catalyst C, expressed as the weight percent oxides, was prepared to give: 3.5% NiO, 22% W03, 22.4% SAPO-34 and 52.2% alumina.

Example 4

The catalysts of Example 1 and Comparative Example I were evaluated for hydrodewaxing and their use in reducing the pour point of hydrocarbon feedstocks without substantial conversion of the feedstock by contacting a selected feedstock with hydrogen at a total pressure of 2000 psig at a Liquid Hourly Space Velocity (LHSV) of 0.25 or 1.0 and a hydrogen flow rate of 10,000 SCFB (Standard Cubic Feet per Barrel) at temperatures between about 700° F. and 800° F. The catalyst of Example 2 was evaluated for dewaxing (in the presence of hydrogen) and reducing the pour point of hydrocarbon feedstocks without substantial conversion to lower boiling products by contacting the catalyst with the feedstock at a total pressure of about 2000 psig at a LHSV of about 1.0 and a hydrogen flow rate of 10,000 SCFB and temperatures between about 700° F. and 800° F. These dewaxing runs using the catalyst of Example 2 were compared with hydrodewaxing runs using the catalyst of comparative Example I at the same LHSV. Reactor effluents containing dewaxed feedstock and converted products were collected. Products boiling below 600° F. were evaluated as to their amount and the conversion was given based on these products. The feedstock employed in the dewaxing examples set forth hereinafter was a vacuum gas oil having an IBP (Initial Boiling Point) of 560° F. and a FBP (Final Boiling Point) of 1148° F. (both determined by ASTM test method D-2887), API Gravity of 22.3 and having a pour point of greater than 95° F. The feedstock was characterized by the following physical and chemical characteristics:

|  | Weight Percent |
| --- | --- |
| Paraffins | 24.1 |
| Mono-naphthenes | 9.5 |
| Poly-naphthenes | 8.7 |
| Mono-aromatics | 13.3 |
| Di-aromatics | 9.3 |
| Tri-aromatics | 4.3 |
| Tetra-aromatics | 2.7 |
| Penta-aromatics | 0.7 |

Figure 2:
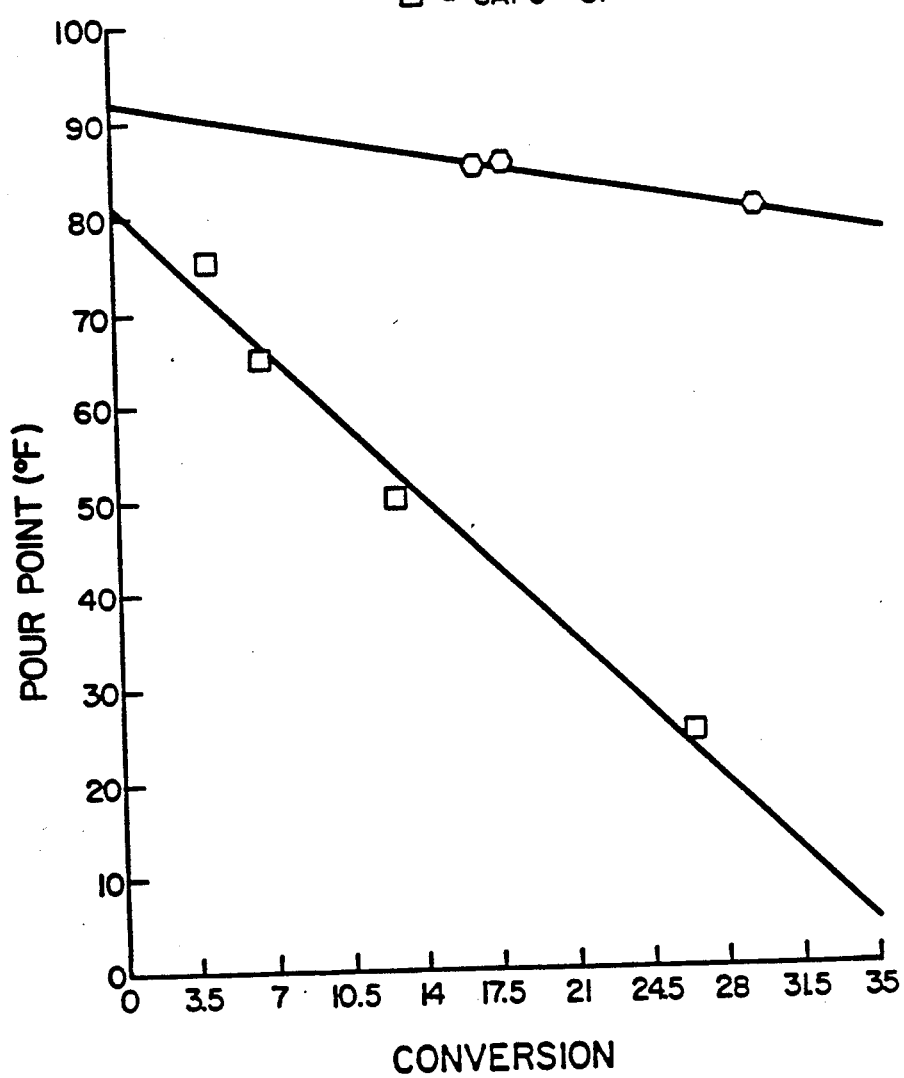
FIG. 2 is a plot of the pour point (°F) as a function of conversion of Catalyst B (SAPO-31) and comparative Catalyst C (SAPO-34).

The reactor effluents were collected and the fraction of the feed converted ("Conversion" on a weight basis) to products boiling below 600° F. determined by simulated distillation (ASTM test method D-2887). Simulated distillation is a procedure for determining the boiling point distribution (i.e., distillation curve) of petroleum fractions from gas chromatographic data. Times required for analyses are comparable to those for the ASTM D86 (atmospheric distillation) or ASTM D1160 (vacuum distillation) methods, but precision is better, and the results obtainable agree closely with true boiling point distillation. ASTM Method D2887-73 describes procedures for petroleum fractions with final boiling points of 1000° F. or less. The official title of the method is "Boiling Range Distribution of Petroleum Fractions by Gas Chromatography", but the older term, "Simulated Distillation" remains in general use. The conversion is reported as the weight percent of feedstock converted to products boiling below 600° F. This feedstock contained relatively little material boiling below 600° F. Therefore, the appearance of products boiling below 600° F. in the reactor effluent represents the undesirable conversion (by cracking) of feedstock to lower boiling range products. The pour points were determined by ASTM test method D-97-66 on the reactor effluents after maintaining the effluent at about 130° F. during its collection. The results in Tables A, B, C. and D demonstrate that at comparable conversions Catalysts A and B (in hydrodewaxing and dewaxing, respectively) provided a reduction in the pour point of the products superior to that obtained by use of Catalyst C. (Comparative Example I) in hydrodewaxing. More importantly, catalysts A and B were able to achieve pour point reductions comparable to those of catalyst C. with significantly less conversion to undesirable cracked products. The data in Tables A and C. are graphically depicted in FIG. 1 and show the decrease in pour point as a function of conversion of products obtained using SAPO-11 (Catalyst A) as compared to SAPO-34 (Catalyst C). The data in Tables B and D are graphically depicted in FIG. 2 and show the decrease in pour point as a function of conversion of products obtained using SAPO-31 (Catalyst B) as compared to SAPO-34 (Catalyst C). FIGS. 1 and 2 demonstrate the decreases in the pour points of the products obtained by Catalyst A and B as compared to Catalyst C. Using Catalysts A or B in hydrodewaxing or dewaxing, substantial decreases in the pour points of the products can be obtained without substantial conversion of the feedstock to products of lower boiling point, thus tending to maximize the yield of products having the desired lower pour point and appropriate ranges of boiling points. These results indicate that catalysts comprising medium or large pore SAPOs as claimed, optionally containing a metal hydrogenation component, are highly effective in both dewaxing and hydrodewaxing. In contrast, using Catalyst C. in hydrodewaxing only minor reductions in pour point are obtained even at substantial degrees of conversion. It is expected that similar results would be obtained from dewaxing processes employing Catalyst C in the absence of hydrogen. Thus, the dewaxing performance of Catalyst B can readily be compared with the hydrodewaxing performance of Catalyst C. under similar conditions. Further, the decrease in pour point increases at a greater rate using Catalysts A and B with increasing conversion, indicating that Catalysts A and B are active and more selective dewaxing catalysts. These results are surprising in view of the disclosure of Lok's U.S. Pat. No. 4,440,871 that various SAPOs can be used as catalysts for processes including catalytic cracking and hydrocracking, while dewaxing is not mentioned. (See columns 70-72.) The only data provided for actual catalytic reactions, the n-butane cracking data in columns 72-73, suggest that SAPO-34 could be expected to be at least as active as the other SAPOs with larger pore sizes, and more selective as well, since its pore size is sufficient to selectively adsorb, and thus, to crack normal paraffins. However, for dewaxing catalysts the large or medium pore species such as SAPO-11 and SAPO-31 are shown herein to be dramatically superior in both activity and selectivity.

TABLE A

| (CATALYST A) | | | |
| --- | --- | --- | --- |
| Temp., °F. | LHSV | Conv. | Pour Point, °F. |
| 701 | 0.25 | 17.3 | 40 |
| 749 | 0.25 | 39.8 | −15 |
| 725 | 0.25 | 28.5 | 10 |

TABLE B

| (CATALYST B) | | | |
| --- | --- | --- | --- |
| Temp., °F. | LHSV | Conv. | Pour Point, °F. |
| 725 | 1.0 | 4.3 | 75 |
| 749 | 1.0 | 6.9 | 65 |
| 772 | 1.0 | 13.0 | 50 |
| 801 | 1.0 | 26.5 | 25 |

TABLE C

| (CATALYST C) | | | |
| --- | --- | --- | --- |
| Temp., °F. | LHSV | Conv. | Pour Point, °F. |
| 702 | 0.25 | 17.6 | 85 |
| 725 | 0.25 | 23.3 | 80 |
| 750 | 0.25 | 35.0 | 75 |

TABLE C-continued

| | (CATALYST C) | | |
|---|---|---|---|
| Temp., °F. | LHSV | Conv. | Pour Point, °F. |
| 774 | 0.25 | 47.1 | 60 |

TABLE D

| | (CATALYST C) | | |
|---|---|---|---|
| Temp., °F. | LHSV | Conv. | Pour Point, °F. |
| 776 | 1.0 | 29.9 | 80 |
| 753 | 1.0 | 18.1 | 85 |
| 752 | 1.0 | 17.0 | 85 |

Example 5

A catalyst (catalyst D) was prepared employing SAPO-11 to demonstrate the hydrodewaxing functionality of the catalysts of this invention. SAPO-11 was prepared according to the procedure described in Example 18 of U.S. Pat. No. 4,440,871, except the final molar ratio of di-n-propylamine to $Al_2O_3$ was 1.0 to 1. The catalyst was prepared by mixing 150 grams of SAPO-11 with 100 grams of Kaiser medium density alumina and a sufficient amount of water to form an extrudable mixture (paste). The mixture was extruded into 1/16 inch extrudates and dried in air at 100° C. for 16 hours. The extrudates were then calcined in air at 480° C. for 2 hours. The extrudates (153 grams) were then mixed (pore filled) with 150 cc of an aqueous solution containing 40.0 grams of nickel nitrate hexahydrate and 48.8 grams of ammonium metatungstate. The mixture was then dried for 16 hours at 100° C. and then calcined at 480° C. for 2 hours. The catalyst was prepared to contain, given as the weight percent oxide: 5 wt. % NiO; 23 wt. % $WO_3$; 36 wt. % SAPO-11; and 36% $Al_2O_3$. The method of manufacture and final composition of catalyst D were the same as those employed for catalyst C, except that SAPO-11 was employed instead of SAPO-34. Chemical analysis for NiO and $WO_3$ gave 5.4 wt. % NiO and 23.0 wt. % $WO_3$.

The catalyst (D) was evaluated by contacting the same feedstock as used in Example 4 with hydrogen at a total pressure of 2000 psig at a Liquid Hourly Space Velocity (LHSV) of 0. and a hydrogen flow rate of 10,000 SCFB (Standard Cubic Feed per Barrel) at temperatures between about 700° F. and 840° F. Reactor effluents containing dewaxed feedstock and converted products were collected. Products boiling below 600° F. were evaluated as to amount and the conversion given based on these products, as in Example 4.

The products of each evaluation were collected and the fraction of the feed (weight basis) converted to products boiling below 600° F. determined by simulated distillation. The conversion is reported as the weight percent of feedstock converted to products boiling below 600° F. The pour points were determined according to ASTM test method of D-97-66 as in Example 4.

The conversions and pour points were as shown in Table E:

TABLE E

| | (CATALYST D) | |
|---|---|---|
| Temperature (°F.) | Conversion | Pour Point (°F.) |
| 700 | 7.52 | 85 |
| 724 | 9.84 | 80 |
| 749 | 17.95 | 70 |
| 769 | 30.06 | 55 |
| 788 | 41.60 | 25 |
| 797 | 36.64 | 35 |
| 788 | 29.89 | 40 |
| 788 | 33.74 | 45 |
| 807 | 43.64 | 30 |
| 821 | 45.12 | 30 |
| 822 | 45.50 | 30 |
| 840 | 56.88 | 20 |

The above data demonstrate the selective conversion of the higher boiling feedstock to lower boiling products in the presence of hydrogen in which products are characterized by a lower pour point than the initial feedstock.

By comparison with the data obtained for comparative catalyst C, in Table D, the above data demonstrate again the superior ability of the catalysts of this invention for reducing pour points with minimum conversion. Thus, for example, catalyst D under mild conditions of 725° F. reaction temperature reduces the pour point of the feedstock from 95° F. to 80° F. with only 9.8 percent loss to products boiling below 600° F. Comparative catalyst C. (Table D) requires a reaction temperature of 776° F. in order to achieve the same modest reduction in pour point while incurring nearly 30 percent loss of feedstock to lighter products. When catalyst D is compared to catalyst C. under very similar reaction temperatures (769° F. for catalyst D and 776° F. for comparative catalyst C), catalyst D reduces the pour point to 55° F. compared to the 80° F. pour point obtained with catalyst C. These results and those of examples 1 through 4 demonstrate both the superior activity for pour point reduction and the superior selectivity of catalysts of the present invention meeting the prerequisite adsorption criteria. Again, such results are surprising and unexpected since Lok, U.S. Pat. No. 4,440,871, has shown that the small pore SAPO-34, which does not meet the present adsorption criterion, was very active for normal paraffin cracking as exemplified by n-butane cracking activity. In fact, SAPO-34 was reported by Lok to be more active than either SAPO-11 or SAPO-31 of the present invention for that normal paraffin conversion reaction.

Example 6 and Comparative Example II

The following examples compare a palladium-loaded SAPO-11 catalyst (Example 6, Catalyst E) against a highly effective commercial dewaxing catalyst containing nickel and tungsten on silicalite (Comparative Example II, Catalyst F) in hydrodewaxing. Catalyst E was found to be significantly more selective at reducing the pour point of the feed than Catalyst F.

The Pd-SAPO-11 catalyst was prepared by ion exchange of SAPO-11 with an aqueous Pd(N03)2 solution. Calcined SAPO-11 (2 hours, 550° C, 53.51g anhydrous) was added to a solution containing 1.50g Pd(NO3)2 and 600 ml of distilled water. The mixture was stirred for 1 hour at ambient temperature, filtered, washed with 2.5 liters of distilled water, and dried at 100° C. overnight. The powder was then bonded with 20 percent silica (Ludox), extruded into 1/16 inch extrudates, dried at 110° C. overnight, and calcined for 2 hours at 500° C. The catalyst was activated in hydrogen at a flow rate of 2.65 SCF/hr and atmospheric pressure while increasing the temperature linearly to 450° F. in 9 hours, soaking at 450° F. for 6 hours, increasing the temperature to 700° F. in 5 hours, soaking at 700° F. for 6 hours and then rapidly cooling to 490° F. The final catalyst contained 0.54 weight percent palladium metal.

Catalyst F was prepared for commercial use to contain, given as the weight percent oxides: 3.5 percent Ni, 21.80 percent WO₃, 22.41 percent Silicalite (S-115 HE-6), 37.35 PA alumina from American Cyanamid and 14.94 percent Catapal (TM) alumina and formed into 1/16 inch extrudates. Silicalite is representative of medium pore molecular sieves of the prior art which have been found useful for dewaxing. The catalyst was activated in flowing 10 percent H₂S in H₂ at a rate of 2.65 SCF/hr and atmospheric pressure while increasing the temperature of the catalyst linearly to 450° F. in 9 hours, soaking at 450° F. for 2 hours, increasing the temperature to 700° F. in 10 hours, soaking at 450° F. for 2 hours, and then rapidly cooling to 490° F.

Catalysts E and F. were evaluated for hydrodewaxing and their use in reducing the pour point of hydrocarbon feedstocks by contacting a selected feedstock with hydrogen at a total pressure of 2000 psig at a liquid Hourly Space Velocity (LHSV) of 1.0 and a hydrogen flow rate of 2.20 Standard Cubic Feet per Hour at temperatures between about 685° and 750° F. The feedstock used had the following properties: 95° F. pour point, 27.5 API(60/60), 5171 ppm S, 818 ppm N, an initial boiling point of 467° F. and a final boiling point of 1,132° F. Reactor effluents containing dewaxed feedstock and converted products were collected. Products boiling below 500° F. were evaluated as to amount and the conversion given based on these products.

The pour points of reactor effluents obtained by using Catalysts E and F. at various temperatures and degrees of conversion (to products boiling below 500° F) are shown in Table F below and FIGS. 3 and 4.

TABLE F

| Conversion Data | | | | | |
|---|---|---|---|---|---|
| Comp. Ex. II Catalyst F | | | Ex. 6 Catalyst E | | |
| Conversion (Percent) | Pour Point (°F.) | Temp. (°F.) | Conversion (Percent) | Pour Point (°F.) | Temp. (°F.) |
| 14.25 | 40 | 702 | 5.35 | 70 | 687 |
| 14.33 | 40 | 701 | 6.27 | 60 | 704 |
| 14.76 | 30 | 712 | 7.65 | 50 | 720 |
| 16.67 | 40 | 704 | 10.50 | 35 | 743 |
| 17.29 | 15 | 722 | | | |
| 18.94 | 5 | 727 | | | |
| 23.45 | 0 | 730 | | | |
| 24.01 | 5 | 727 | | | |
| 25.08 | −20 | 741 | | | |
| 25.50 | −30 | 748 | | | |
| 27.49 | −35 | 750 | | | |
| 28.48 | −42 | 749 | | | |

FIG. 3 is a plot of reactor effluent pour point as a function of feedstock conversion (loss) for catalyst E and comparative catalyst F. Linear regression analysis followed by interpolation of the data presented reveals that catalyst E is surprisingly and significantly more selective than the commercial catalyst (F) containing the medium pore molecular sieve, Silicalite. These interpolated data are presented in Table 2. To achieve a 35° F. pour point effluent, comparative catalyst F suffers 15.1 percent loss by conversion to lighter products whereas catalyst E suffers only 10.5 percent conversion to lights to produce a similar pour point product. Thus, to attain the corresponding reductions in pour point catalyst E required a substantially lower degree of conversion than comparative Catalyst F. Clearly, with catalyst E a 4.6 percent greater yield of pour point reduced (dewaxed) feedstock is recovered. A yield advantage of this magnitude is of tremendous economic importance and easily outweighs the somewhat reduced activity of catalyst E compared to catalyst F, as seen in FIG. 4.

Comparative catalyst F, containing the medium pore molecular sieve Silicalite, presumably meets the adsorption criterion of the current invention. However, Silicalite is a silica-based molecular sieve and lacks the chemical constituents of the SAPOs. The above examples clearly demonstrate the unexpected nature of the present invention, since other molecular sieves having similar pore sizes and known to be effective at selective pour point reduction cannot match the performance achieved with the catalysts of the present invention which possess both the required pore sizes and framework compositions.

TABLE G

| Comparison of Catalysts E and F | | | |
|---|---|---|---|
| Catalyst | Pour Point | Conversion | Temperature |
| E | 35 | 10.5 | 743 |
| F | 35 | 15.1 | 707 |

What is claimed is:

1. An improved process for catalytically dewaxing a hydrocarbon feedstock boiling above 350° F. and containing high pour point paraffinic waxes and hydrocarbons, comprising selective conversion of said paraffinic waxes and hydrocarbons, said process comprising contacting the hydrocarbon feedstock at effective dewaxing conditions with a dewaxing catalyst comprising an amount of at least one silicoaluminophospate (SAPO) effective in reducing the pour point of said hydrocarbon feedstock, wherein said SAPO is characterized in its calcined form by an adsorption of isobutane of at least 2 percent by weight at a pressure of 500 torr and a temperature of 20 C, said catalyst further comprising an inorganic oxide matrix component present in an amount between about 0 and about 99 percent by weight, based on the total weight of said catalyst, so as to produce products having a reduced pour point relative to the hydrocarbon feedstock.

2. An improved process for catalytically hydrodewaxing a hydrocarbon feedstock boiling above 350° F. and containing high pour point paraffinic waxes and hydrocarbons, comprising selective conversion of said paraffinic waxes and hydrocarbons to reduce the pour point, said process comprising contacting the hydrocarbon feedstock with a catalyst in the presence of hydrogen at effective hydrodewaxing conditions wherein the catalyst comprises at least one hydrogenation component and an amount of at least one silicoaluminophosphate (SAPO) effective in reducing the pour point of said hydrocarbon feedstock wherein said SAPO is characterized in its calcined form by an adsorption of isobutane of at least 2 percent by weight at a pressure of 500 torr and a temperature of 20° C, said catalyst further comprising an inorganic oxide matrix component present in an amount between about 0 and about 99 percent by weight, based on the total weight of said catalyst, so as to produce products having a reduced pour point relative to the hydrocarbon feedstock.

3. The process of claim 1 or claim 2 wherein said SAPO is further characterized in its calcined form by an adsorption of triethylamine of from zero to less than 5 percent by weight at a pressure of 2.6 torr and a temperature of 22° C.

4. The process of claim 3 wherein said adsorption of triethylamine is less than 3 percent by weight.

5. The process of claim 3 wherein said catalyst contains at least one zeolitic aluminosilicate active as a component in dewaxing catalysts wherein said zeolitic aluminosilicate is present in a weight ratio between about 1:10 and about 500:1 of said zeolitic aluminosilicate to said SAPO.

6. The process of claim 5 wherein the weight ratio of zeolitic aluminosilicate to said SAPO is between about 1:10 and about 50:1.

7. The process of claim 6 wherein the weight ratio of zeolitic aluminosilicate to said SAPO is between about 1:1 and about 50:1.

8. The process of claim 3 wherein said inorganic oxide matrix component is present in an amount between about 5 and about 95 percent by weight.

9. The process of claim 3 wherein said SAPO has at least part of its cations as hydrogen-forming species.

10. The process of claim 9 wherein said hydrogen-forming species is $NH_4^+$ or $H^+$.

11. The process of claim 1 wherein the process is carried out by contacting a hydrocarbon feedstock boiling between 400° F. and about 1200° F. with said catalyst at a temperature between about 500° F. and about 1200° F, at a pressure between about subatmospheric to about 500 atmospheres and a liquid hourly space velocity between about 0.2 and about 50.

12. The process of claim 2 wherein the process is carried out by contacting a hydrocarbon feedstock boiling between about 400° F. and about 1200° F, with said catalyst in the presence of hydrogen at a temperature between about 400° F. and about 900° F, at a pressure between about 10 psig. and about 2500 psig. and at a molar ratio of hydrogen to hydrocarbon feedstock between about 1 and 100.

13. The process of claim 8 wherein said inorganic oxide matrix component is selected from the group consisting of clays, silicas, aluminas, alumina-borias, alumina-titanias and mixtures thereof.

14. The process of claim 3 wherein said SAPO is selected from the group consisting of SAPO-11, SAPO-31, SAPO-41 and mixtures thereof.

15. The process of claim 1 or claim 2 wherein said hydrocarbon feedstock is selected from the group consisting of fuel oils, jet fuel, lube oils, naphtha, reformate, kerosene, diesel fuel, Fischer Tropsch reaction products, atmospheric residual oils, vacuum residual oils, syncrudes and mixtures thereof.

16. The process of claim 15 wherein said feedstock is a residual oil, lube oil or syncrude boiling above 700° F.

17. The process of claim 5 wherein said zeolitic aluminosilicate is selected from the group consisting of zeolite Y, ultra-stable Y zeolites, zeolite X, zeolite beta, zeolite KZ-20, faujasite, LZ-210, LZ-10, ZSM-type zeolites selected from the group consisting of ZSM-5, ZSM-11, ZSM-12, ZSM-23, ZSM-35, ZSM-38 and ZSM-48; and mixture thereof.

18. The process of claim 5 wherein said zeolitic aluminosilicate is selected from the group consisting of zeolite Y, ultra-stable Y zeolites, zeolite X, zeolite beta, zeolite KZ-20, faujasite, LZ-210, LZ-10, ZSM zeolites and mixtures thereof.

19. The process of claim 18 wherein said zeolitic aluminosilicate is ZSM-5.

20. The process according to claim 2 wherein said hydrogenation component is at least one metal selected from the group consisting of Pt, Pd, Rh, Ru, Ni, W, Mo, Co, Ti, Cr and mixtures thereof.

21. The process of claim 20 wherein said metal is selected from the group consisting of Pt Pd Rh Ru and mixtures thereof and is present in an effective amount between about 0.05 weight percent and about 1.5 weight percent.

22. The process of claim 20 wherein said metal is selected from the group consisting of Ni, W, Mo, Co, Ti, Cr and mixtures thereof and is present in an amount between about 1.0 and about 30 percent by weight.

23. The process of claim 3 wherein said catalyst contains at least one silicalite active as a component in dewaxing catalysts wherein said silicalite is present in a weight ratio between about 1:10 and about 500:1 of said silicalite to said SAPO.

24. A improved process for catalytically dewaxing a hydrocarbon feedstock boiling above 350° F. and containing high pour point paraffinic waxes and hydrocarbons comprising selective conversion of said paraffinic waxes and hydrocarbons, said process comprising contacting the hydrocarbon feedstock at effective dewaxing conditions with a dewaxing catalyst comprising an amount of at least one silicoaluminophosphate (SAPO) effective in reducing the pour point of said hydrocarbon feedstock, wherein said SAPO is selected from the group consisting of SAPO-5, SAPO-11, SAPO-31, SApO-37, SApO-40 and SApO-41, so as to produce products having a reduced pour point relative to the hydrocarbon feedstock.

25. The process of claim 24 wherein said SAPO is SAPO-11 or SAPO-31.

26. A improved process for catalytically hydrodewaxing a hydrocarbon feedstock boiling above 350° F. and containing high pour point paraffinic waxes and hydrocarbons, comprising selective conversion of said paraffinic waxes and hydrocarbons to reduce the pour point, said process comprising contacting said hydrocarbon feedstock with a hydrodewaxing catalyst in the presence of hydrogen at effective hydrodewaxing conditions, wherein said catalyst comprises at least one hydrogenation component and an amount of at least one silicoaluminophosphate (SAPO) effective in reducing the pour point of said hydrocarbon feedstock, wherein said SAPO is selected from the group consisting of SAPO-5, SAPO-11, SAPO-31, SAPO-37, SAPO-40 and SAPO-41, so as to produce products having a reduced pour point relative to the hydrocarbon feedstock.

27. The process of claim 26 wherein said SAPO is SAPO-11 or SAPO-31.

28. A process for catalytically reducing the pour point of a hydrocarbon feedstock boiling above 350° F. and containing high boiling and high pour point paraffinic waxes and hydrocarbons without substantial conversion of said feedstock to products of lower boiling point than the initial boiling point of said feedstock, comprising the step of contacting said hydrocarbon feedstock under effective dewaxing conditions with a catalyst comprising an amount of at least one silicoaluminophosphate (SAPO) effective in substantially reducing the pour point of said feedstock, wherein said SAPO is characterized in its calcined form by an adsorption of isobutane of at least 2 percent by weight at a pressure of 500 torr and a temperature of 20° C, said catalyst further comprising an inorganic oxide matrix component present in an amount between about 0 and about 99 percent by weight, based on the total weight of said catalyst, so as to produce products having a substantially reduced pour point relative to said feedstock without a substantial portion of said feedstock being converted to obtain the said reduction in pour point.

29. The process according to claim 28 wherein a smaller portion of said feedstock is converted for a given reduction in pour point than with the use of a traditional zeolite or silicalite dewaxing catalyst.

30. A process according to claim 28 wherein said feedstock is contacted with said catalyst at a temperature between about 500° F. and about 1200° F, a pressure between subatmospheric and about 500 atmospheres and an liquid hourly space velocity between about 0.2 and about 50.

31. A process according to claim 28 wherein said feedstock is contacted with said catalyst in the presence of hydrogen at a temperature between about 400° F. and about 900° F, a pressure between about 10 psig and about 2500 psig and a molar ratio of hydrogen to hydrocarbon feedstock between about 1 and 100, and wherein said catalyst further comprises at least one hydrogenation component.

32. The process of claim 30 or claim 31 wherein said pour point of said products is at least about 30° F. less than the pour point of said feedstock and less than about 15 percent of said feedstock is converted to products of lower boiling point.

33. The process of claim 30 or 31 wherein said pour point of said products is at least about 50° F. less than the pour point of said feedstock and less than about 40 percent of said feedstock is converted to products of lower boiling point.

34. A process according to claim 30 or claim 31 wherein said pour point of said products is at least 80° F. less than the pour point of said feedstock and less than about 50 percent of said feedstock is converted to products of lower boiling point.

35. The process of claim 30 or claim 31 wherein said pour point of said products is reduced by at least 1° F. below the pour point of said feedstock for each unit percent conversion of said feedstock to products of lower boiling point.

36. The process of claim 30 or claim 31 wherein said SAPO is further characterized in its calcined form by an adsorption of triethylamine of from zero to less than 5 percent by weight at a pressure of 2.6 torr and a temperature of 22° C.

37. The process of claim 30 or claim 31 wherein said catalyst contains at least one zeolitic aluminosilicate active as a component in dewaxing catalysts wherein said zeolitic aluminosilicate is present in a weight ratio between about 1:10 and about 500:1 of said zeolitic aluminosilicate to said SAPO.

38. The process of claim 30 or claim 31 wherein said SAPO has at least part of its cations as hydrogen-forming species.

39. The process of claim 30 or claim 31 wherein said SAPO is selected from the group consisting of SAPO-5, SAPO-11, SAPO-31, SAPO-37, SAPO-40 and SAPO-41.

40. The process of claim 30 or claim 31 wherein said hydrocarbon feedstock is selected from the group consisting of fuel, jet fuel, lube oils, turbine oils, naphtha, reformate, kerosene, diesel fuel, Fisher Tropsch reaction products, atmospheric residual oils, vacuum residual oils, syncrudes, and mixtures thereof.

41. The process according to claim 31 wherein said hydrogenation component is at least one metal selected from the group consisting of Pt, Pd, Rh, Ru, Ni, W, Mo, Co, Ti and Cr.

42. The process of claim 30 or claim 31 wherein said catalyst contains least one silicalite active as a component in dewaxing catalysts wherein said silicalite is present in a weight ratio between about 1:10 and about 500:1 of said silicalite to said SAPO.

* * * * *